(12) United States Patent
Kang et al.

(10) Patent No.: US 8,838,159 B2
(45) Date of Patent: Sep. 16, 2014

(54) METHOD AND APPARATUS FOR TRANSMITTING REFERENCE SIGNAL IN MULTI-NODE SYSTEM

(75) Inventors: Ji Won Kang, Anyang-si (KR); Jin Young Chun, Anyang-si (KR); Ki Tae Kim, Anyang-si (KN); Su Nam Kim, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 283 days.

(21) Appl. No.: 13/169,519

(22) Filed: Jun. 27, 2011

(65) Prior Publication Data

US 2011/0319109 A1 Dec. 29, 2011

Related U.S. Application Data

(60) Provisional application No. 61/358,948, filed on Jun. 28, 2010, provisional application No. 61/434,398, filed on Jan. 19, 2011, provisional application No. 61/427,103, filed on Dec. 23, 2010.

(30) Foreign Application Priority Data

May 16, 2011 (KR) .................. 10-2011-0045726

(51) Int. Cl.
*H04B 7/26* (2006.01)
*H04W 88/02* (2009.01)
*H04W 36/00* (2009.01)
*H04L 5/00* (2006.01)

(52) U.S. Cl.
CPC ............ *H04L 5/0048* (2013.01); *H04L 5/0032* (2013.01); *H04L 5/0035* (2013.01); *H04B 7/2656* (2013.01); *H04L 5/0023* (2013.01); *H04L 5/0091* (2013.01); *H04L 5/001* (2013.01)
USPC ...................... 455/507; 455/556.1; 455/562.1

(58) Field of Classification Search
USPC .................... 455/507, 556.1, 562.1
See application file for complete search history.

(56) References Cited

U.S. PATENT DOCUMENTS

| | | | |
|---|---|---|---|
| 2007/0104164 A1* | 5/2007 | Laroia et al. | 370/338 |
| 2010/0022184 A1* | 1/2010 | Khoshnevis et al. | 455/7 |
| 2010/0040019 A1* | 2/2010 | Tinnakornsrisuphap et al. | 370/331 |
| 2010/0069122 A1* | 3/2010 | Ito | 455/562.1 |
| 2010/0173639 A1* | 7/2010 | Li et al. | 455/450 |
| 2010/0195600 A1* | 8/2010 | Gorokhov et al. | 370/329 |
| 2011/0051681 A1* | 3/2011 | Ahn et al. | 370/330 |
| 2011/0105184 A1* | 5/2011 | Piirainen et al. | 455/562.1 |
| 2011/0249648 A1* | 10/2011 | Jen | 370/330 |
| 2012/0149297 A1* | 6/2012 | Suh et al. | 455/7 |

* cited by examiner

*Primary Examiner* — Edward Urban
*Assistant Examiner* — Ralph H Justus
(74) *Attorney, Agent, or Firm* — Morgan, Lewis & Bockius LLP

(57) ABSTRACT

A method of transmitting a reference signal in a multi-node system including a plurality of nodes and a base station for controlling the plurality of nodes is provided. The method includes: transmitting node information to a user equipment; and transmitting the reference signal to the user equipment from at least one node among the plurality of nodes on the basis of the node information, wherein the node information includes information capable of identifying the reference signal transmitted from the at least one node, and wherein each of the plurality of nodes transmits a different reference signal.

8 Claims, 16 Drawing Sheets

METHOD AND APPARATUS FOR TRANSMITTING REFERENCE SIGNAL IN MULTI-NODE SYSTEM

CROSS-REFERENCE TO RELATED APPLICATIONS

This application claims the benefit of priority of U.S. Provisional application Ser. No. 61/358,948 filed on Jun. 28, 2010, Ser. No. 61/427,103 filed on Dec. 23, 2010, Ser. No. 61/434,398 filed on Jan. 19, 2011 and Korean Patent Application No. 10-2011-0045726 filed on May 16, 2011 which are incorporated by reference in its entirety herein.

BACKGROUND

1. Technical Field

The present invention relates to wireless communications, and more particularly, to a method and apparatus for transmitting a reference signal by a node in a multi-node system.

2. Related Art

A data transfer amount of a wireless network has been rapidly increased in recent years. It is because various devices, e.g., a smart phone, a tablet personal computer (PC), or the like, that require machine-to-machine (M2M) communication and a high data transfer amount have been introduced and propagated. To satisfy the required high data transfer amount, a carrier aggregation technique, a recognition radio technique, or the like for effectively using more frequency bands, and a multiple antenna technique, a multiple base station cooperation technique, or the like for increasing data capacity within a limited frequency have recently drawn attention.

In addition, the wireless network has been evolved in a direction of increasing density of a node capable of accessing to an area around a user. Herein, the node implies an antenna (or antenna group), in a distributed antenna system (DAS), separated from other antennas by a certain distance or farther. However, the node is not limited to this definition, and thus can also be used in a broader sense. That is, the node may be a pico-cell eNB (PeNB), a home eNB (HeNB), a remote radio head (RRH), a remote radio unit (RRU), a relay, a distributed antenna, etc. A wireless communication system having such a node with higher density can provide higher system performance by cooperation between nodes. That is, better system performance can be achieved when one base station controller manages transmission and reception of respective nodes and thus the nodes operate as if they are antennas or an antenna group for one cell, in comparison with a case where the respective nodes operate as an independent base station (BS), advanced BS (ABS), node-b (NB), eNode-B (eNB), access point (AP), etc., and thus do not cooperate with each other. Hereinafter, a wireless communication system including a plurality of nodes is referred to as a multi-node system.

In the multi-node system, a node for transmitting a signal to a user equipment may differ depending on the user equipment, and also a node for receiving a signal from the user equipment may also differ depending on the user equipment. Accordingly, there is a need for a method and apparatus for transmitting a reference signal capable of identifying each node in a multi-node system by considering the characteristic of the multi-node system.

SUMMARY

The present invention provides a method and apparatus for transmitting a reference signal in a multi-node system.

According to an aspect of the present invention, a method of transmitting a reference signal in a multi-node system including a plurality of nodes and a base station for controlling the plurality of nodes is provided. The method includes: transmitting node information to a user equipment; and transmitting the reference signal to the user equipment from at least one node among the plurality of nodes on the basis of the node information. The node information includes information capable of identifying the reference signal transmitted from the at least one node. Each of the plurality of nodes transmits a different reference signal.

In the aforementioned aspect of the present invention, each of the plurality of nodes may transmit a reference signal generated by using a different cell identification (ID) as a node ID.

In addition, each of the plurality of nodes may transmit a reference signal generated by using a node ID consisting of a function of only some of the cell ID used by the base station.

In addition, when the cell ID used by the base station consists of a cell ID and an ID included in the cell ID group, a node ID of each of the plurality of nodes may include the same bit as the cell ID group.

In addition, when the cell ID used by the base station consists of a cell ID group and an ID of the cell ID group, a node ID of each of the plurality of nodes may include the same bit of the ID included in the cell ID group.

In addition, each of the plurality of nodes may transmit a reference signal corresponding to a different antenna port.

In addition, each of the plurality of nodes may transmit a reference signal corresponding to a different reference signal configuration number.

In addition, each of the plurality of nodes may transmit a reference signal corresponding to the same cell ID, the same antenna port, and the same reference signal configuration number, and the reference signal may be transmitted by using a different time, frequency, or code.

In addition, the node information may include at least one of a node ID, antenna port information, and reference signal configuration information used by each of the plurality of nodes.

In addition, each of the plurality of nodes may be an antenna or antenna group coupled to the base station in a wired fashion.

In addition, the method further includes receiving, by the base station, feedback information from the user equipment via at least one node among the plurality of nodes. In this case, the feedback information may include at least one of a cell ID, an antenna port number, and a reference signal configuration number which are used when each of the plurality of nodes transmits the reference signal.

According to another aspect of the present invention, an apparatus for transmitting a reference signal is provided. The apparatus includes: a radio frequency (RF) unit for transmitting and receiving a radio signal; a processor coupled to the RF unit. The RF unit includes a plurality of nodes. The processor transmits information to a user equipment and transmits the reference signal to the user equipment from at least one node among the plurality of nodes on the basis of the node information. The node information includes information capable of identifying the reference signal transmitted from the at least one node, and each of the plurality of nodes transmits a different reference signal.

In the aforementioned aspect of the present invention, the reference signal may be transmitted by being identified via each of the plurality of nodes by using any one of a node ID of each of the plurality of nodes, antenna port information, and reference signal configuration information.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE.

Figure 1:
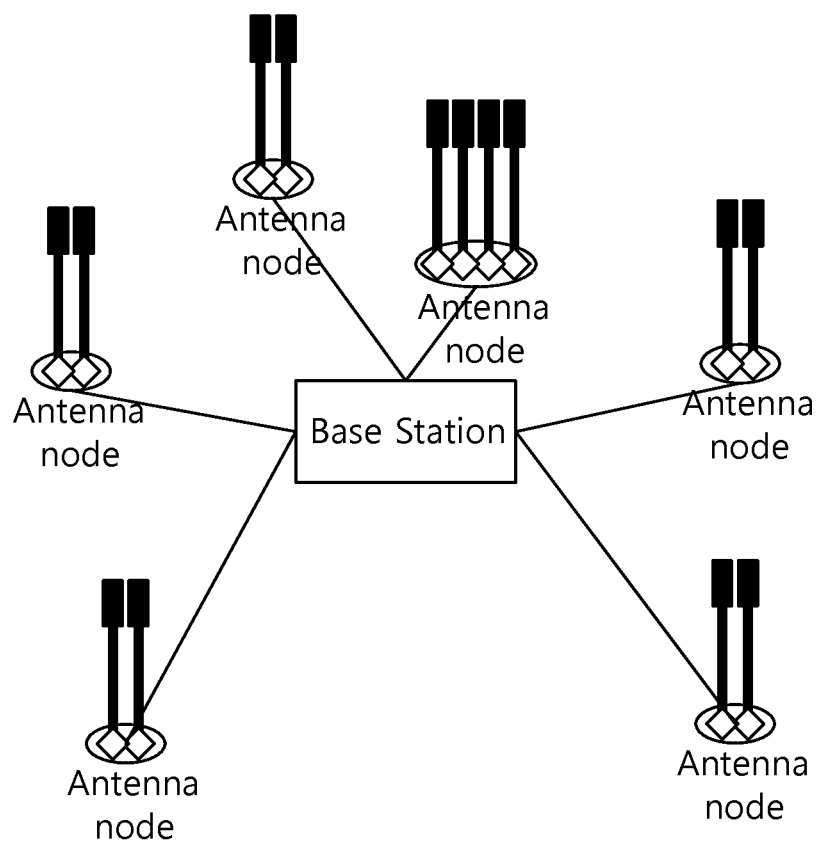
FIG. 1 shows an example of a multi-node system.

FIG. 1 shows an example of a multi-node system.

Referring to FIG. 1, the multi-node system includes a base station (BS) and a plurality of nodes.

In FIG. 1, a node indicated by an antenna node may imply a macro BS (or eNB), a pico-cell eNB (PeNB), a home eNB (HeNB), a remote radio head (RRH), a relay, a distributed antenna, etc. Such a node is also referred to as a point.

In the multi-node system, if one BS controller manages transmission or reception of all nodes and thus individual nodes operate as if they are a part of one cell, then the system can be regarded as a distributed antenna system (DAS) which constitutes one cell. In the DAS, separate node identifications (IDs) may be given to the individual nodes, or the individual nodes may operate as if they are some antenna groups within a cell without the additional node IDs. In other words, the DAS is a system in which antennas (i.e., nodes) are deployed in various positions within a cell in a distributed manner, and these antennas are managed by the BS. The DAS is different from a conventional centralized antenna system (CAS) in which antennas of the BS are concentrated in a cell center.

If the individual nodes have separate cell IDs and perform scheduling and handover in the multi-node system, this can be regarded as a multi-cell (e.g., macro-cell/femto-cell/pico-cell) system. If the multiple cells are configured such that they overlap with each other according to coverage, this is called a multi-tier network.

Figure 2:
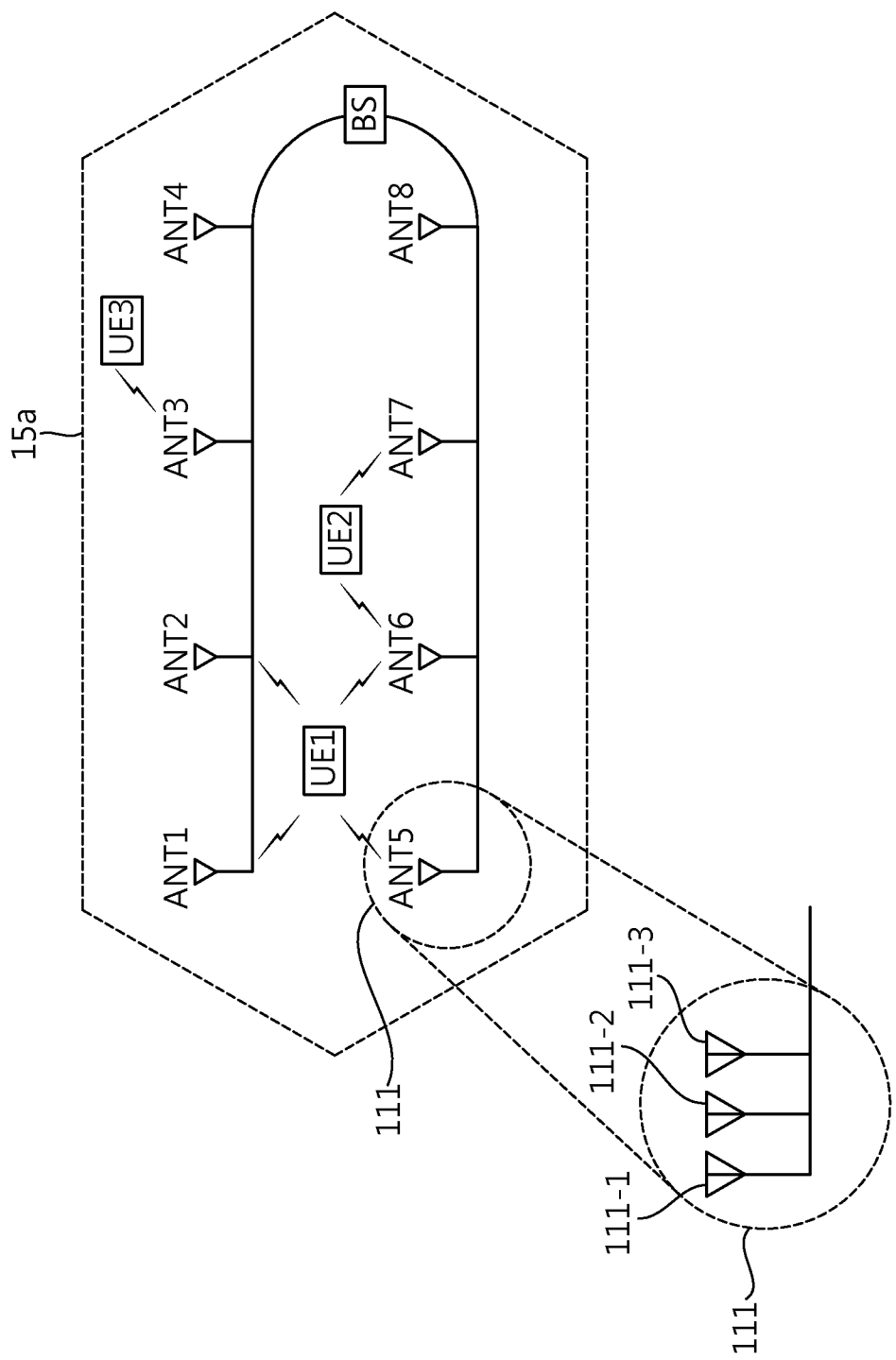
FIG. 2 shows a distributed antenna system as an example of a multi-node system.

FIG. 2 shows a DAS as an example of a multi-node system.

Referring to FIG. 2, the DAS includes a BS and a plurality of BS antennas (e.g., ANT 1 to ANT 8, hereinafter a BS antenna is simply referred to as an antenna). The ANT 1 to the ANT 8 can be coupled to the BS in a wired fashion. Unlike the conventional CAS, the DAS has antennas which are deployed in various positions within a cell in a distributed manner instead of being concentrated in a specific position (e.g., a cell center) of a cell 15a. Herein, one antenna may exist in each separate place within the cell (in case of ANTs 1 to 4 and ANTs 6 to 8). In addition, similarly to the ANT 5 (indicated by a reference number 111), several antennas 111-1, 111-2, and 111-3 may exist in a concentrated manner. The antennas which exist in the concentrated manner may constitute one antenna node.

The antennas may be distributed in such a manner that antenna coverage overlaps so that rank 2 (or higher) transmission is possible. That is, antenna coverage of each antenna may reach up to an adjacent antenna. In this case, user equipments (UEs) existing within a cell may receive signals of which strengths change variously according to a location in the call, a channel state, etc., from a plurality of antennas. Referring to the example of FIG. 2, a UE 1 can receive a signal having good signal strength from the ANTs 1, 2, 5, and 6. On the other hand, signals transmitted from the ANTs 3, 4, 7, and 8 may have a negligible effect on the UE 1 due to a path loss.

A UE 2 can receive a signal having good signal strength from the ANTs 6 and 7, and signals transmitted from the remaining antennas may have a negligible effect. Likewise, a UE 3 can receive a signal having good signal strength from only the ANT 3, and signals of the remaining antennas may have negligible weak signal strength.

Due to the aforementioned feature, the DAS may easily perform multiple input multiple output (MIMO) communication with respect to UEs separated from each other within a cell. In the aforementioned example, communication can be performed for the UE 1 through the ANTs 1, 2, 5, and 6, for the UE 2 through the ANT 7, and for the UE 3 through the ANT 3. The ANTs 4 and 8 may transmit signals for the UE 2 or the UE 3, or may transmit no signal. That is, the ANTs 4 and 8 may operate optionally in an off state.

As described above, when MIMO communication is performed in the DAS, the number of layers (i.e., the number of transmission streams) of each UE may be various. In addition, a different antenna (or antenna group) may be allocated to each UE. In other words, the DAS can support a specific antenna (or specific antenna group) for each UE among all antennas in a system. An antenna provided to a UE may vary over time.

Figure 3:
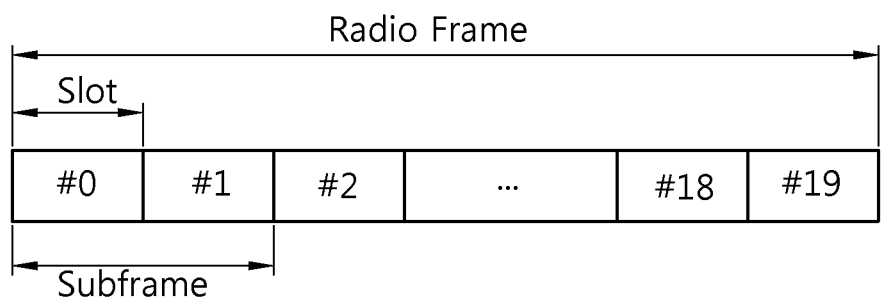
FIG. 3 shows a frequency division duplex (FDD) radio frame structure in 3$^{rd}$ generation partnership project (3GPP) long term evolution (LTE).

FIG. 3 shows a frequency division duplex (FDD) radio frame structure in 3GPP LTE. Such a radio frame structure is called a frame structure type 1.

Referring to FIG. 3, a radio frame includes 10 subframes. One subframe is defined as two consecutive slots. A time required for transmitting one subframe is called a transmission time interval (TTI). A time length of the radio frame is $T_f=307200*T_s=10$ ms, and consists of 20 slots. A time length of the slot is $T_{slot}=15360*T_s=0.5$ ms, and is numbered from 0 to 19. A downlink (DL) in which each node or BS transmits a signal to a UE and an uplink (UL) in which the UE transmits a signal to each node or BS are identified in a frequency domain.

Figure 4:
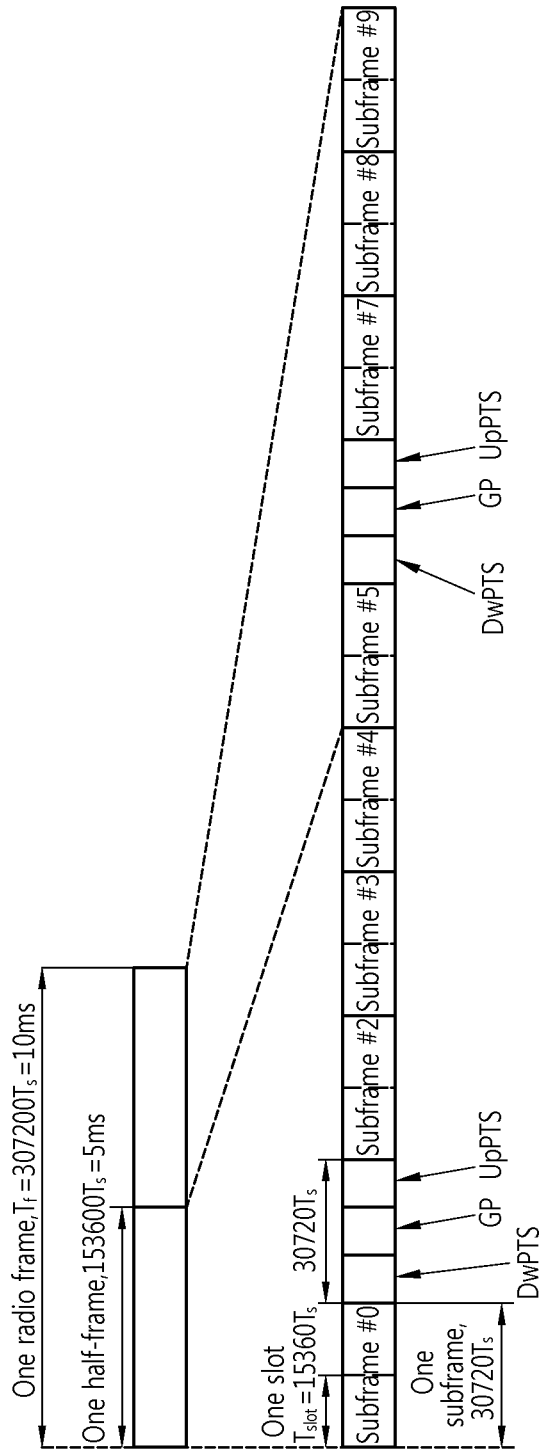
FIG. 4 shows a time division duplex (TDD) radio frame structure in 3GPP LTE.

FIG. 4 shows a time division duplex (TDD) radio frame structure in 3GPP LTE. Such a radio frame structure is called a frame structure type 2.

Referring to FIG. 4, one radio frame has a length of 10 milliseconds (ms), and consists of two half-frames each having a length of 5 ms. One half-frame consists of five subframes each having a length of 1 ms. Each subframe is designated as any one of a UL subframe, a DL subframe, and a special subframe. One radio frame includes at least one UL subframe and at least one DL subframe. One subframe consists of two consecutive slots. For example, one subframe may have a length of 1 ms, and one slot may have a length of 0.5 ms.

The special subframe is a specific period positioned between the UL subframe and the DL subframe for the purpose of UL-DL separation. One radio frame includes at least one special subframe. The special subframe includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and UL transmission synchronization of a UE. The GP is positioned between the UL time slot and the DL time slot and is used to remove interference that occurs in UL transmission due to a multi-path delay of a DL signal.

In FDD and TDD radio frames, one slot includes a plurality of orthogonal frequency division multiplexing (OFDM) symbols in a time domain and a plurality of resource blocks (RBs) in a frequency domain. Since 3GPP LTE uses OFDMA in DL transmission, the OFDM symbol is for expressing one symbol period, and thus can be referred to as other terms such as an SC-FDMA symbol. The RB is a resource allocation unit, and includes a plurality of consecutive subcarriers in one slot.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference in order to explain the radio frame structure described with reference to FIG. 3 and FIG. 4.

The structure of the radio frame is for exemplary purposes only, and thus the number of subframes included in the radio frame or the number of slots included in the subframe, and the number of OFDM symbols included in the slot may change variously.

Figure 5:
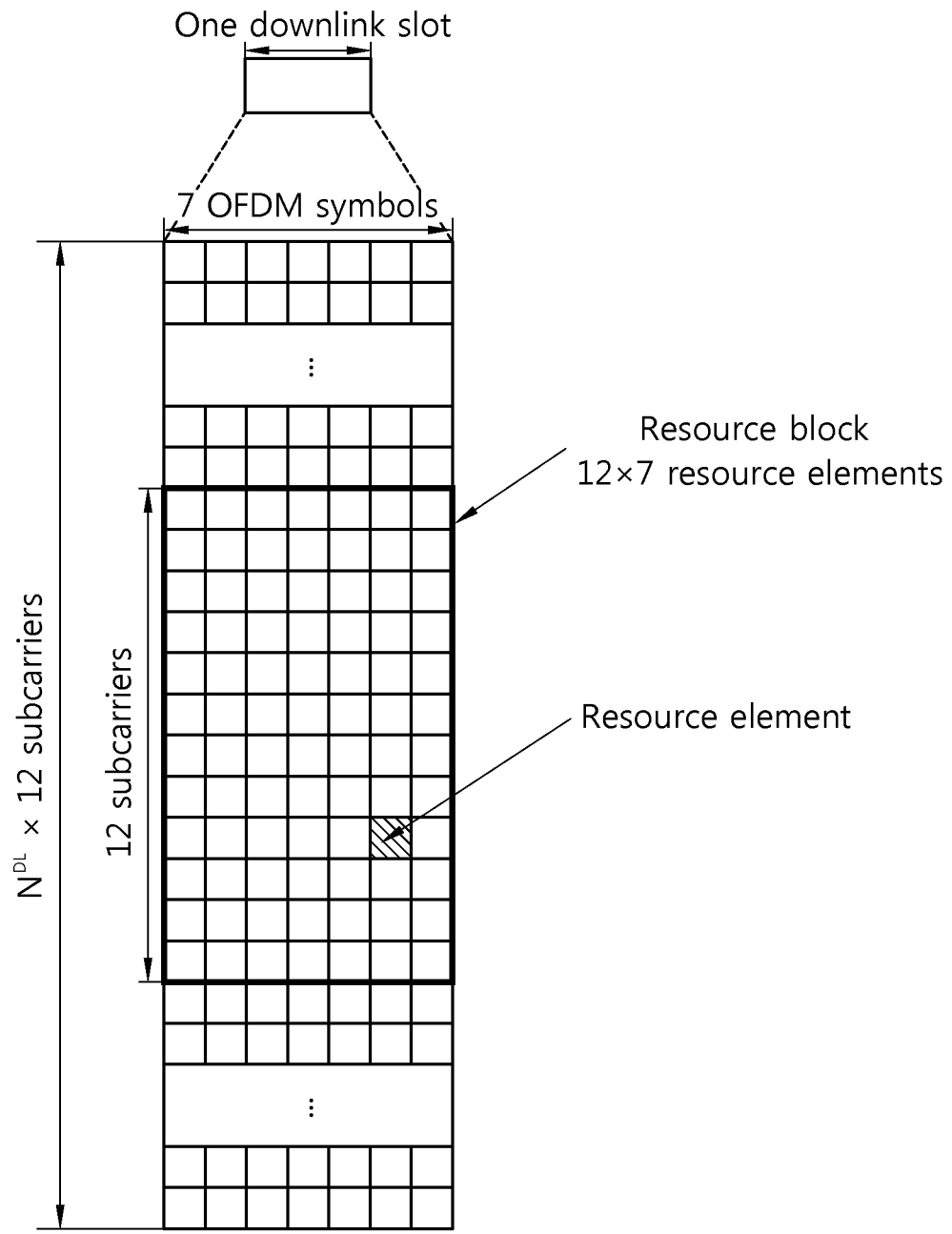
FIG. 5 shows an example of a resource grid for one downlink slot.

FIG. 5 shows an example of a resource grid for one DL slot.

Referring to FIG. 5, one DL slot includes a plurality of OFDM symbols in a time domain. It is described herein that one DL slot includes 7 OFDMA symbols and one resource block (RB) includes 12 subcarriers in a frequency domain for exemplary purposes only, and the present invention is not limited thereto.

Each element on the resource grid is referred to as a resource element, and one RB includes 12×7 resource elements. The number $N^{DL}$ of RBs included in the DL slot depends on a DL transmission bandwidth determined in a cell. The aforementioned resource grid for the DL slot can also apply to the UL slot.

Figure 6:
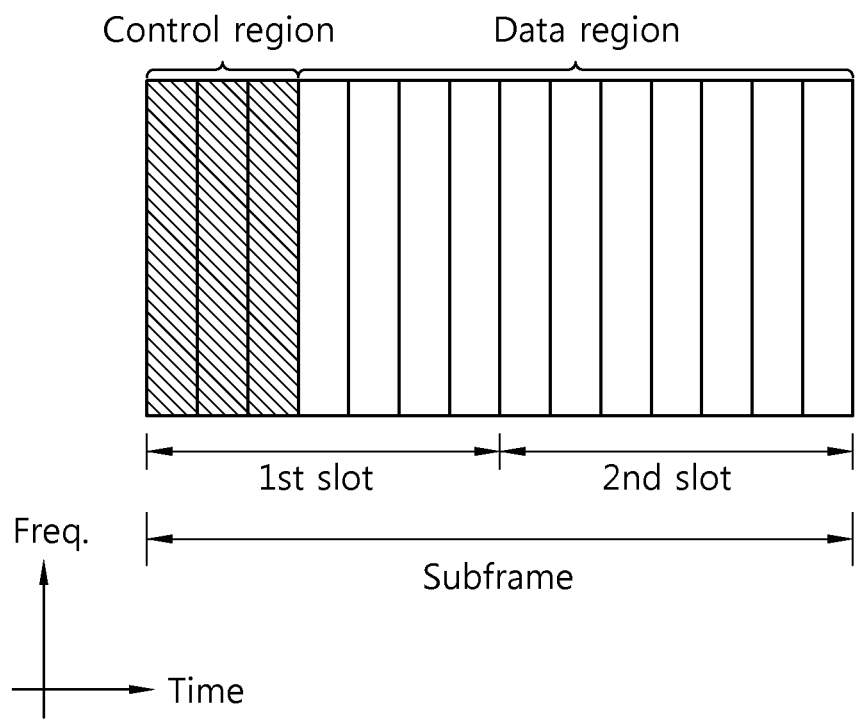
FIG. 6 shows an example of a downlink subframe structure.

FIG. 6 shows an example of a DL subframe structure.

Referring to FIG. 6, a subframe includes two consecutive slots. Up to three preceding OFDM symbols of a $1^{st}$ slot in the subframe may correspond to a control region to which control channels are allocated. The remaining OFDM symbols may correspond to a data region to which a physical downlink shared channel (PDSCH) is allocated.

Examples of a DL control channel include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols (i.e., a size of a control region) used for transmission of control channels in the subframe. Control information transmitted through the PDCCH is referred to as downlink control information (DCI). The DCI indicates UL resource allocation information, DL resource allocation information, a UL transmit power control command for any UE groups, etc. The PHICH carries an acknowledgement (ACK)/not-acknowledgement (NACK) signal for a UL hybrid automatic repeat request (HARQ). That is, the ACK/NACK signal for UL data transmitted by a UE is transmitted through the PHICH.

The PDSCH is a channel for transmitting control information and/or data. The UE may decode the control information transmitted through the PDCCH to read the data transmitted through the PDSCH.

Hereinafter, a method of transmitting a reference signal (RS) in a multi-node system will be described.

In LTE Rel-8, a cell-specific reference signal (CRS) is used to perform channel measurement and to perform channel estimation for a PDSCH.

Figure 7:
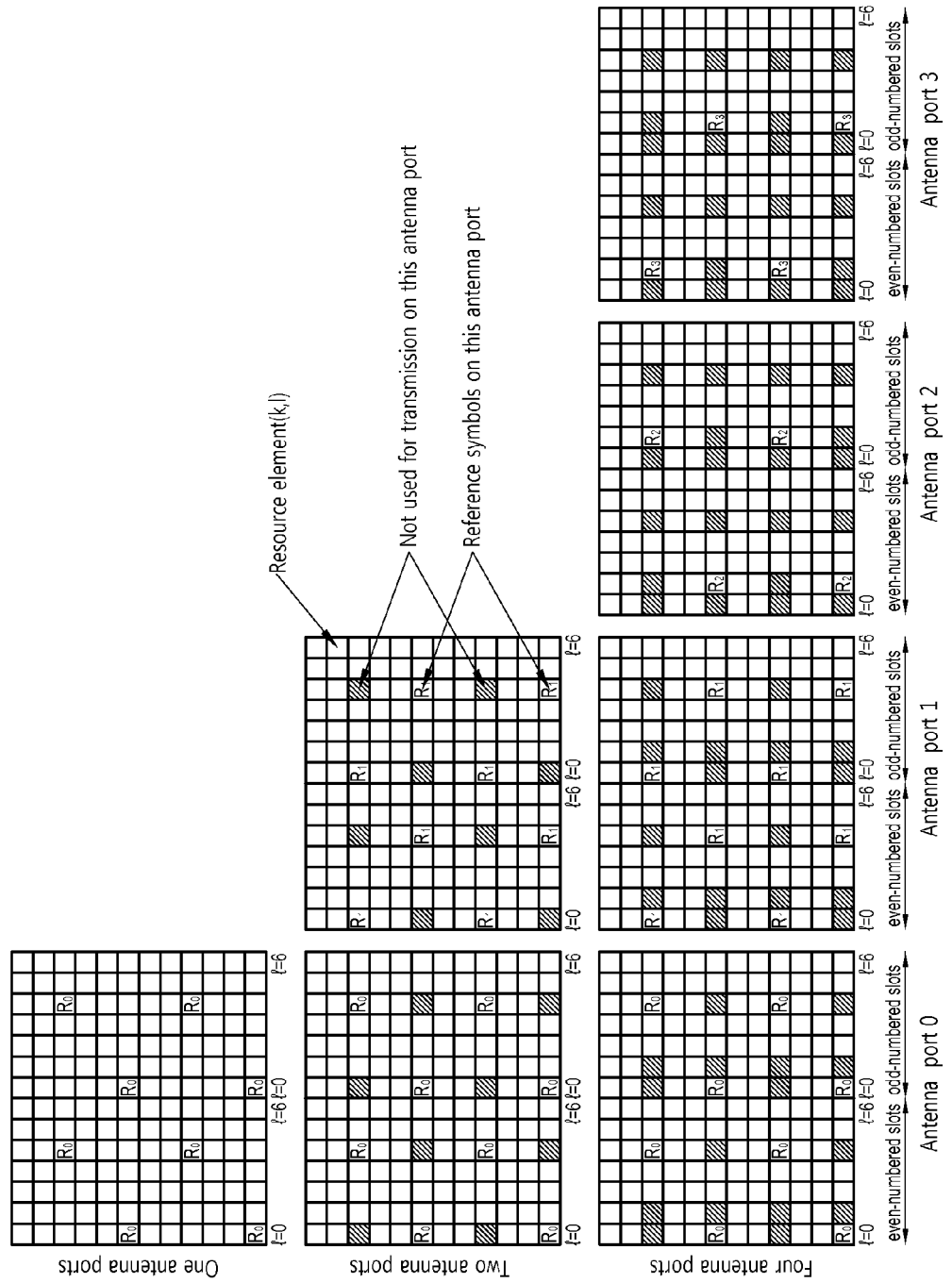
FIG. 7 shows mapping of a cell-specific reference signal (CRS) in a normal cyclic prefix (CP).
Figure 8:
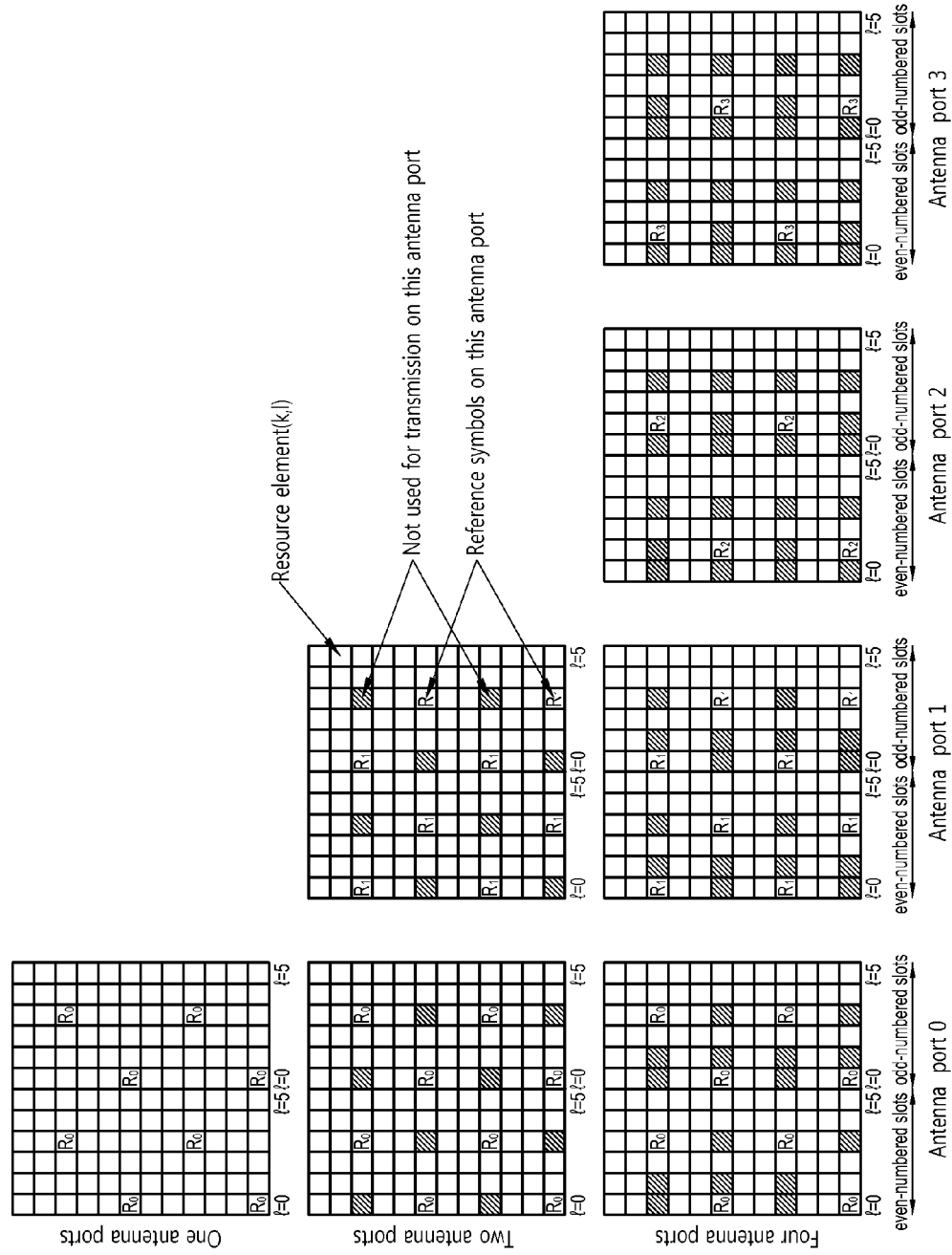
FIG. 8 shows mapping of a CRS in an extended CP.

FIG. 7 shows mapping of a CRS in a normal CP. FIG. 8 shows mapping of a CRS in an extended CP.

Referring to FIG. 7 and FIG. 8, in case of multiple antenna transmission using a plurality of antennas, a resource grid exists for each antenna, and at least one RS for each antenna may be mapped to the resource grid. The RS for each antenna consists of reference symbols. Rp denotes a reference symbol of an antenna #p (where p∈{0, 1, 2, 3}). R0 to R3 are not mapped to overlapping resource elements.

In one OFDM symbols, each Rp may be positioned with a spacing of 6 subcarriers. In a subframe, the number of R0s is equal to the number of R1s, and the number of R2s is equal to the number of R3s. In the subframe, the number of R2s and R3s is less than the number of R0s and R1s. Rp is not used in any transmission through antennas except for the antenna #p.

In LTE-A, in addition to the CRS, a channel status information reference signal (CSI-RS) can be used for channel measurement and for channel estimation for a PDSCH. Hereinafter, the CSI-RS will be described.

Unlike the CRS, the CSI-RS has up to 32 different configurations in order to decrease inter-cell interference (ICI) in a multi-cell environment including a heterogeneous network environment.

The configuration for the CSI-RS differs depending on the number of antenna ports in a cell, and is given between neighboring cells as much different as possible. The CSI-RS is identified according to a cyclic prefix (CP) type. According to a frame structure type (i.e., FDD for a frame structure type 1 and TDD for a frame structure type 2), the CSI-RS may be configured such that it applies both to the frame structure type 1 and the frame structure type 2, or may be configured such that it applies only to the frame structure type 2.

Unlike the CRS, the CSI-RS supports up to 8 antenna ports. {15}, {15, 16}, {15, 16, 17, 18}, and {15, . . . , 22} are supported in an antenna port p. That is, one, two, four, and eight antenna ports are supported. A subcarrier spacing Δf is defined only for 15 kHz.

A sequence $r_{1,n_s}(m)$ for the CSI-RS is generated by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m + 1)),$$ [Equation 1]

$$m = 0, 1, \ldots, N_{RB}^{max,DL} - 1$$

where, $$c_{init} =$$

$$2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 1 above, $n_s$ denotes a slot number in a radio frame, and l denotes an OFDM symbol number in a slot. c(i) denotes a pseudo random sequence, and starts with $c_{init}$ in each OFDM symbol. $N_{ID}^{cell}$ denotes a physical layer cell ID.

In subframes configured to transmit the CSI-RS, the RS sequence $r_{1,n_s}(m)$ is mapped to a complex-valued modulation symbol $a_{k,l}^{(p)}$ used as a reference symbol for the antenna port p.

$r_{1,n_s}(m)$ and $a_{k,l}^{(p)}$ are related by Equation 2 below.

$$a_{k,l}^{(p)} = w_{l''} \cdot r_{l,n_s}(m')$$ [Equation 2]

where $$k =$$

$$k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2 above, (k', l') and $n_s$ are given in Table 1 and Table 2 below. The CSI-RS can be transmitted in a DL slot satisfying the conditions of Table 1 and Table 2 below (herein, 'mod' denotes a modular operation, that is, denotes a remainder obtained by dividing $n_s$ by 2).

Table 1 below shows a CSI-RS configuration in case of a normal CP.

TABLE 1

| | CSI reference signal config- uration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 2 below shows a CSI-RS configuration in case of an extended CP.

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

A subframe including the CSI-RS must satisfy Equation 3 below.

$$(10n_f + \lfloor n_s/2 \rfloor - \Delta_{CSI-RS}) \bmod T_{CSI-RS} = 0 \quad \text{[Equation 3]}$$

In addition, the CSI-RS can be transmitted in a subframe satisfying the condition of Table 3 below.

Table 3 below shows a CSI-RS subframe configuration related to a duty cycle. Herein, $n_f$ denotes a system frame number.

TABLE 3

| CSI-RS-Subframe Config $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

In Table 3 above, 'CSI-RS-SubframeConfig' (i.e., $I_{CSI-RS}$) is a value given by a higher layer and denotes a CSI-RS subframe configuration. $T_{CSI-RS}$ denotes a cell-specific subframe configuration period, and $\Delta_{CSI-RS}$ denotes a cell-specific subframe offset. The CSI-RS supports 5 duty cycles according to a CQI/CSI feedback, and can be transmitted with a different subframe offset in each cell.

Figure 9:
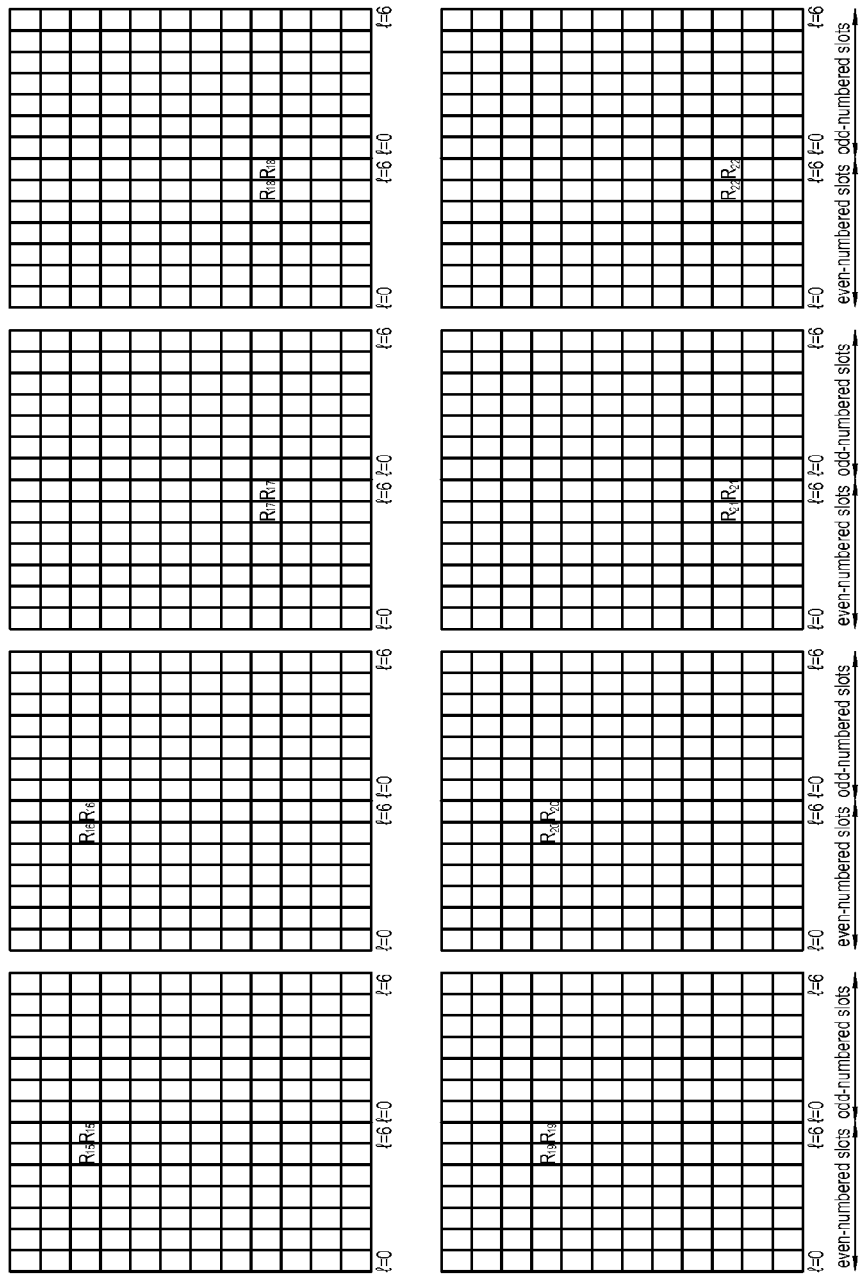
FIG. 9 shows mapping of a channel status information reference signal (CSI-RS) for a CSI configuration 0 in a normal CP.
Figure 10:
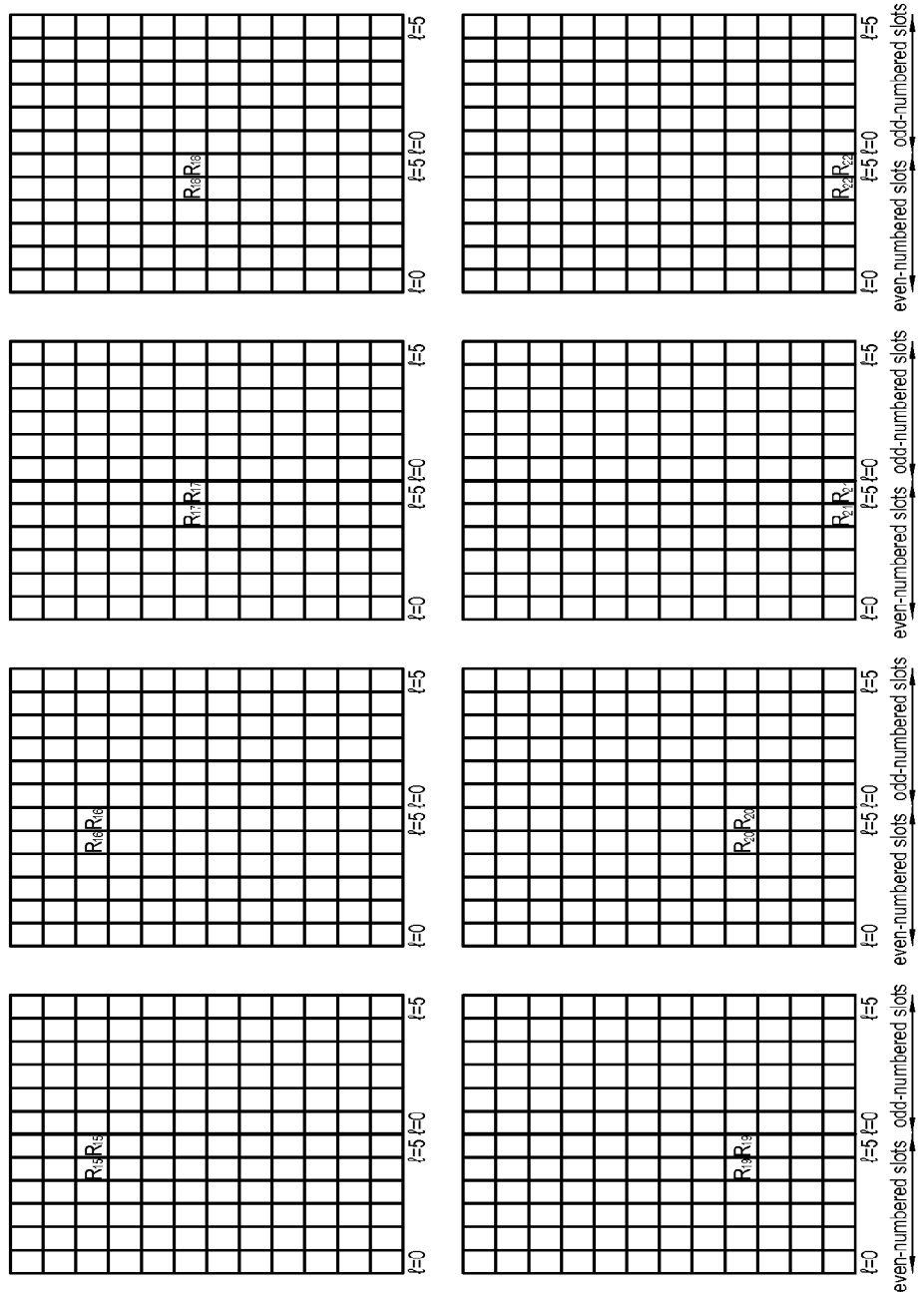
FIG. 10 shows mapping of a CSI-RS for a CSI configuration 0 in an extended CP.

FIG. 9 shows mapping of a CSI-RS for a CSI configuration 0 in a normal CP. FIG. 10 shows mapping of a CSI-RS for a CSI configuration 0 in an extended CP.

Referring to FIG. 9 and FIG. 10, the CSI-RS is transmitted by using two consecutive identical resource elements with respect to two antenna ports, e.g., p={15, 16}, {17, 18}, {19, 20}, {21, 22}. In this case, an orthogonal cover code (OCC) is used in transmission.

A plurality of CSI-RS configurations can be used in a given cell. In this case, one CSI-RS configuration in which a UE assumes non-zero transmission power may be present, and one or more (or none) configurations in which the UE assumes zero transmission power may be present.

The CSI-RS is not transmitted in the following cases.
1. A special subframe having a frame structure type 2.
2. When collision occurs among a synchronization signal, a PBCH, and an SIB (system information block).
3. A subframe in which a paging message is transmitted.

A resource element (k,l) used to transmit an CSI-RS for any antenna port of a set S is not used to transmit a PDSCH for any antenna port in the same slot. In addition, the resource element (k,l) is not used to transmit a CSI-RS for any other antenna ports except for the set S in the same slot. Herein, antenna ports included in the set S are {15, 16}, {17, 18}, {19, 20}, and {21, 22}.

Parameters required for transmission of the aforementioned CSI-RS include: 1) a CSI-RS port number; 2) CSI-RS configuration information; 3) a CSI-RS subframe configuration (i.e., $I_{CSI-RS}$); 4) a subframe configuration period (i.e., $T_{CSI-RS}$); and 5) a subframe offset $\Delta_{CSI-RS}$. These parameters are cell-specific parameters, and are given through higher layer signaling.

A BS can use the aforementioned RS (e.g., CRS, CSI-RS, etc.) so that a UE can identify each node in a multi-node system.

In the multi-node system, nodes for receiving a signal transmitted by the UE to the BS may be some antennas or an antenna group in the multi-node system. In addition, in the multi-node system, feedback information of channel state information (CSI), e.g., CQI (channel quality indicator), PMI (precoding matrix index), RI (rank indicator), etc., corresponding to some preferred nodes may be transmitted by the UE to the BS. Therefore, the UE needs to identify each node in the multi-node system. For this, the BS may transmit node information allocated in a UE-specific manner (i.e., node ID, the number of nodes, the number of antenna ports, etc., to be described below) to the UE. By using the node information, the UE can identify an RS transmitted by each node. A case where a CSI-RS is used as the RS transmitted by each node is described for example in the following description. However, the present invention is not limited thereto, and thus another RS such as a positioning RS (PRS), a CRS, or the like can also be used.

Figure 11:
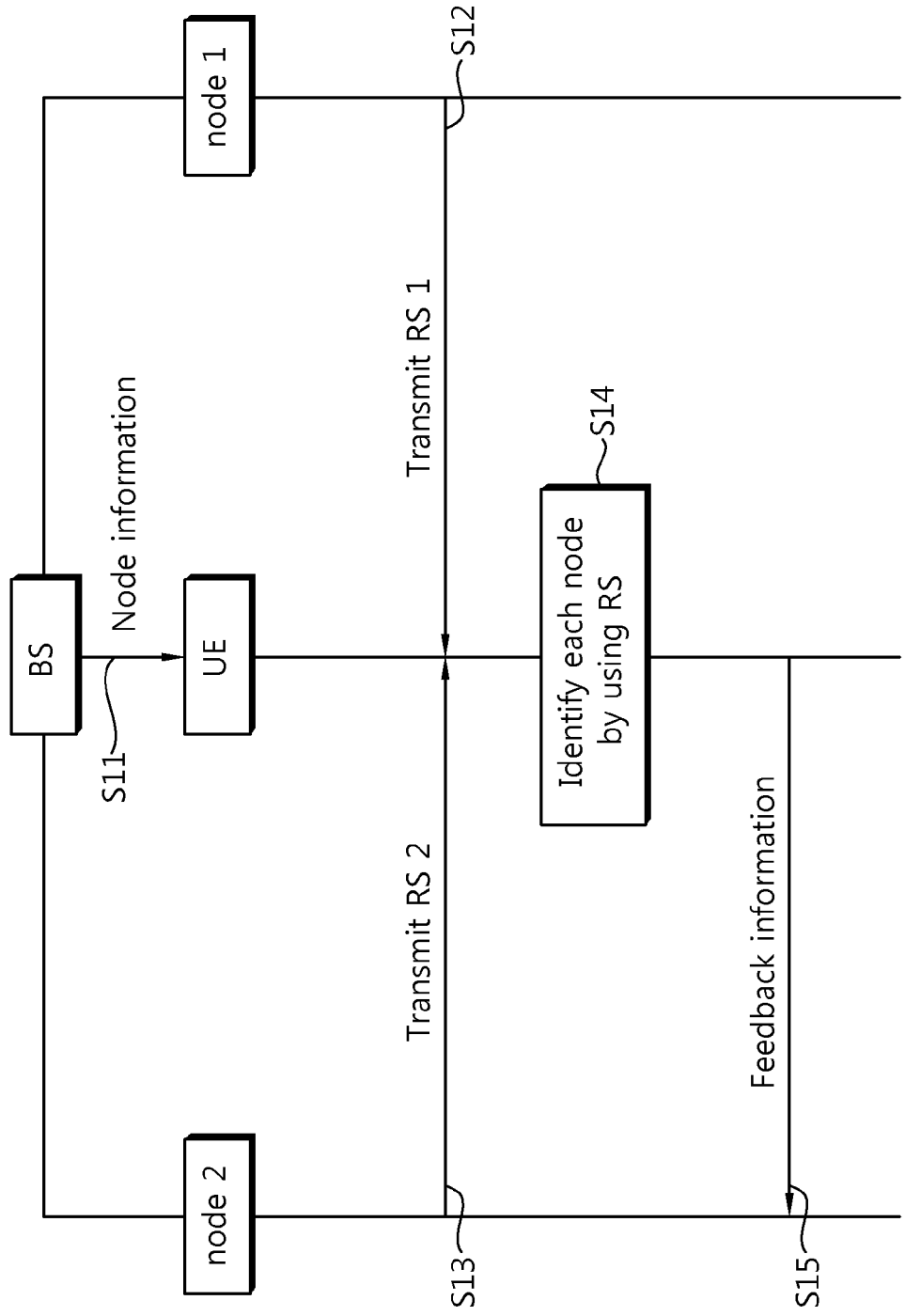
FIG. 11 shows a method of transmitting a reference signal (RS) of a multi-node system according to an embodiment of the present invention.

FIG. 11 shows a method of transmitting an RS of a multi-node system according to an embodiment of the present invention.

Referring to FIG. 11, a BS transmits node information to a UE (step S11). Herein, the node information is given so that the UE can identify an RS transmitted by each node. The node information may include at least one of a node ID used in each node, antenna port information, RS configuration information, a sharing indicator for indicating whether a plurality of nodes share one RS pattern, sharing node information for indicating the number of nodes that share the same RS pattern, and an RS resource division index for indicating resource sharing when the plurality of nodes share one RS resource.

For example, the BS transmits an RS 1 to the UE via a node 1 (step S12), and transmits an RS 2 to the UE via a node 2 (step S13). Herein, the node 1 and the node 2 may be nodes controlled and managed by the BS, for example, may be antennas or an antenna group.

By using the RS, the UE identifies a specific node from which a signal is transmitted (step S14), and thereafter generates a necessary operation (e.g., generating feedback information) and transmits it to a destination node (e.g., the node 2) (step S15).

A method of transmitting an RS from a plurality of nodes controlled and managed by a BS in a multi-node system will be described hereinafter in detail. The multi-node system can allow a different RS to be transmitted for each node so that the UE can identify the node. The RS can be reused according to a distance between nodes, transmit power, etc. The following four methods are provided as a method of transmitting a different RS from each node in a multi-node system.

Method 1: Method of transmitting an RS corresponding to different cell ID for each node.

Method 2: Method of transmitting an RS corresponding to a different antenna port from each node in a multi-node system. In this case, each node has the same cell ID.

Method 3: Method of transmitting an RS according to a different RS configuration from each node in a multi-node system. In this case, the RS configuration includes a subframe configuration.

Method 4: Method of alternately transmitting an RS corresponding to the same cell ID, the same antenna port, and the same RS configuration from each node in a multi-node system.

Each of the aforementioned four methods will be described in detail hereinafter.

Figure 12:
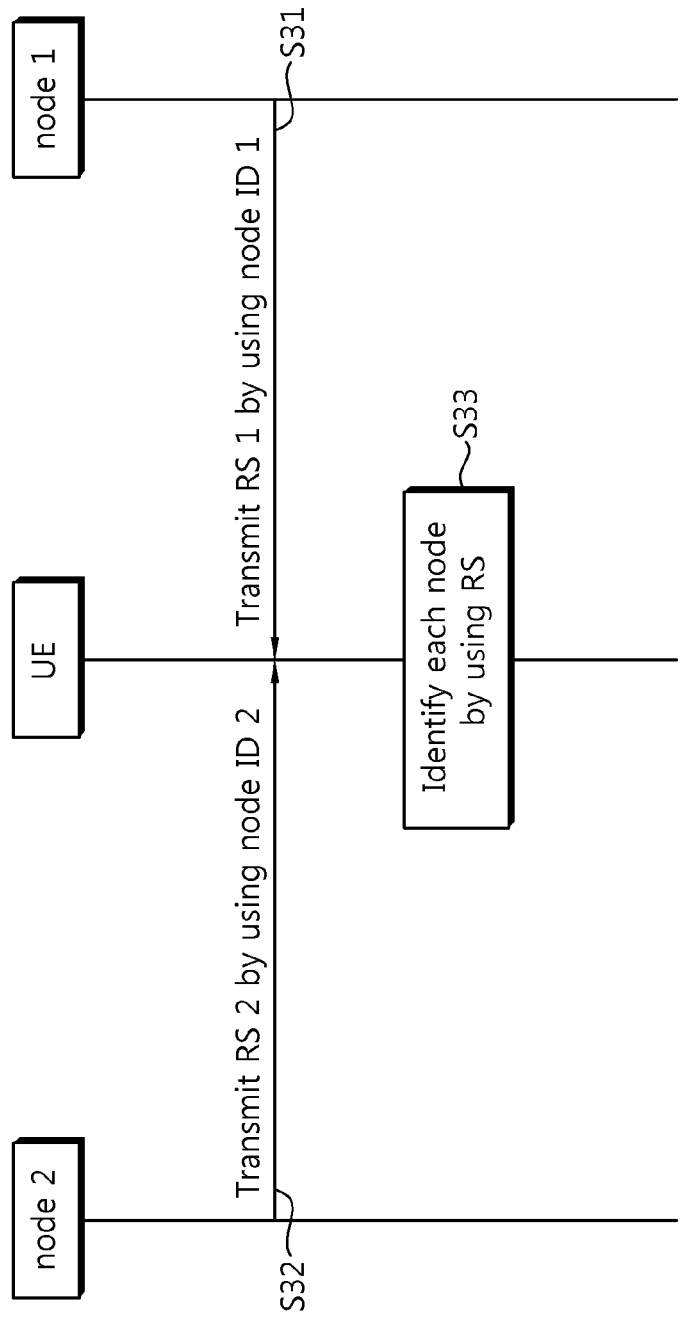
FIG. 12 shows a method of transmitting an RS corresponding to a cell identification (ID) different for each node (i.e., Method 1).

FIG. 12 shows a method of transmitting an RS corresponding to a cell ID different for each node (i.e., Method 1). In FIG. 12, a UE may be in a state where node information including a node ID for each node is received from a BS.

Referring to FIG. 12, a node 1 transmits an RS 1 by using a node ID 1 (step S31), and a node 2 transmits an RS 2 by using a node ID 2 (step S32).

As a node ID for each node, a specific cell ID may be directly used in the same format as a cell ID (i.e., a physical layer cell ID), or the cell ID may be modified and used in another format. For example, the node ID may consist of a function of the cell ID. In this case, the node ID included in node information may consist of a function of only some of constitutional elements of the cell ID in order to reduce signaling overhead.

For example, 504 physical layer cell IDs are present in LTE. The physical layer cell ID is grouped into 168 unique physical layer cell ID groups, and each group includes 3 unique IDs. Each physical layer cell ID is included in one cell physical layer ID group.

That is, the cell ID is configured such as $N_{ID}^{cell}=3 N_{ID}^{(1)}+N_{ID}^{(2)}$ in LTE. Herein, $N_{ID}^{(1)}$ denotes a cell ID group, and may be any one of values 0 to 167. $N_{ID}^{(2)}$ denotes a cell ID within the cell ID group, and may be any one of values 0 to 2. In this case, $N_{ID}^{(1)}$ is expressed in 8 bits, and $N_{ID}^{(2)}$ is expressed in 2 bits. A node ID allocated to nodes coupled to the same BS can be specified such that some bits of the aforementioned $N_{ID}^{(1)}$ and/of $N_{ID}^{(2)}$ are identical. For example, all nodes coupled to the same BS can have the same $N_{ID}^{(1)}$. Then, the each node is identified by $N_{ID}^{(2)}$.

When the node ID consists of the function of only some of constitutional elements of the cell ID, the BS does not have to signal all cell IDs allocated to the nodes by using the node information. Rather, the BS can signal only $N_{ID}^{(2)}$.

In addition, the UE does not have to feed back all cell IDs to feed back a preferred node. Rather, the UE can transmit only $N_{ID}^{(2)}$ of the node. Therefore, when the UE feeds back the preferred node to the BS, only 2-bit information may be transmitted instead of transmitting 10-bit information to identify the node.

Alternatively, it can be specified such at all nodes coupled to the BS have the same $N_{ID}^{(2)}$, and upper 4 bits of $N_{ID}^{(1)}$ are identical. In this case, each antenna node can be identified only with lower 4 bits of $N_{ID}^{(1)}$. Accordingly, overhead decreases in node-related signaling.

A relation between the node ID and the cell ID (i.e., a BS ID) can be configured variously. For example, when the node ID consists of N bits, nodes having the same M bits out of the N bits (where N>M) can be set to a node group, and after allocating a node group ID, the cell ID can be mapped to the node group ID. That is, this is a method in which the cell ID is assigned after generating one node group ID for each cell. Then, the UE can know a node group ID at the same time of obtaining the node ID, and also can predict the cell ID if the UE knows mapping relation between the node group ID and the cell ID.

Alternatively, another method is also possible in which a BS has an independent cell ID (i.e., a BS ID), and a node ID is allocated to each node coupled to the BS according to a specific rule. For example, if the number of nodes coupled to the BS is N, the BS can assign IDs 0 to N−1 to the N nodes. That is, a node ID (i.e., $N_{ID}^{node}$) can be expressed by $N_{ID}^{node}=f(N_{ID}^{cell}, N_{ID}^{(3)})$ or $N_{ID}^{node}=f(N_{ID}^{(3)})$. Herein, $N_{ID}^{(3)}$ may be a new seed number for generating each node ID. That is, the node ID can be generated by using a function of the cell ID, or may be generated by using the new seed number independently from the cell ID.

The node ID can be used explicitly or implicitly for signaling information. If the node ID consists of the function of the cell ID as described above, a node ID having a reduced amount of information can be used in signaling. If the relation between the cell ID and the node ID are specified, the cell ID can be used as the node ID. In this case, a range of the cell ID that can be used as the node ID can be limited to a specific range. Alternatively, the range of the cell ID used as the node ID may be out of the range of the existing cell ID (in case of LTE, in the range of 0 to 503).

For example, if two nodes are present within a cell, two cell IDs (e.g., a cell ID 1 and a cell ID 2) each having a different value, with respect to a cell ID used for CRS generation (e.g., a cell ID 0 used in a BS), may be used to generate respective CSI-RSs, and thereafter the CSI-RSs generated respectively for the cell ID 1 and the cell ID 2 may be transmitted as RSs of the respective nodes. In this case, the cell ID 1 and the cell ID 2 play a role of node IDs of two nodes, respectively.

The UE identifies each node by using an RS identified by each node ID (step S33). As described in Equation 1 above, the sequence used for the RS is determined by the cell ID, and each node applies a sequence, which is generated by directly using a different cell ID or by using a modified cell ID, to the RS. The UE may use node information to know a node ID of each node (herein, the node ID is given in the same format as the cell ID or in a function form of the cell ID), and may use an RS, to which the node ID is applied, to identify each node. The UE may measure the RS and then transmit feedback information on a corresponding node to the BS.

Figure 13:
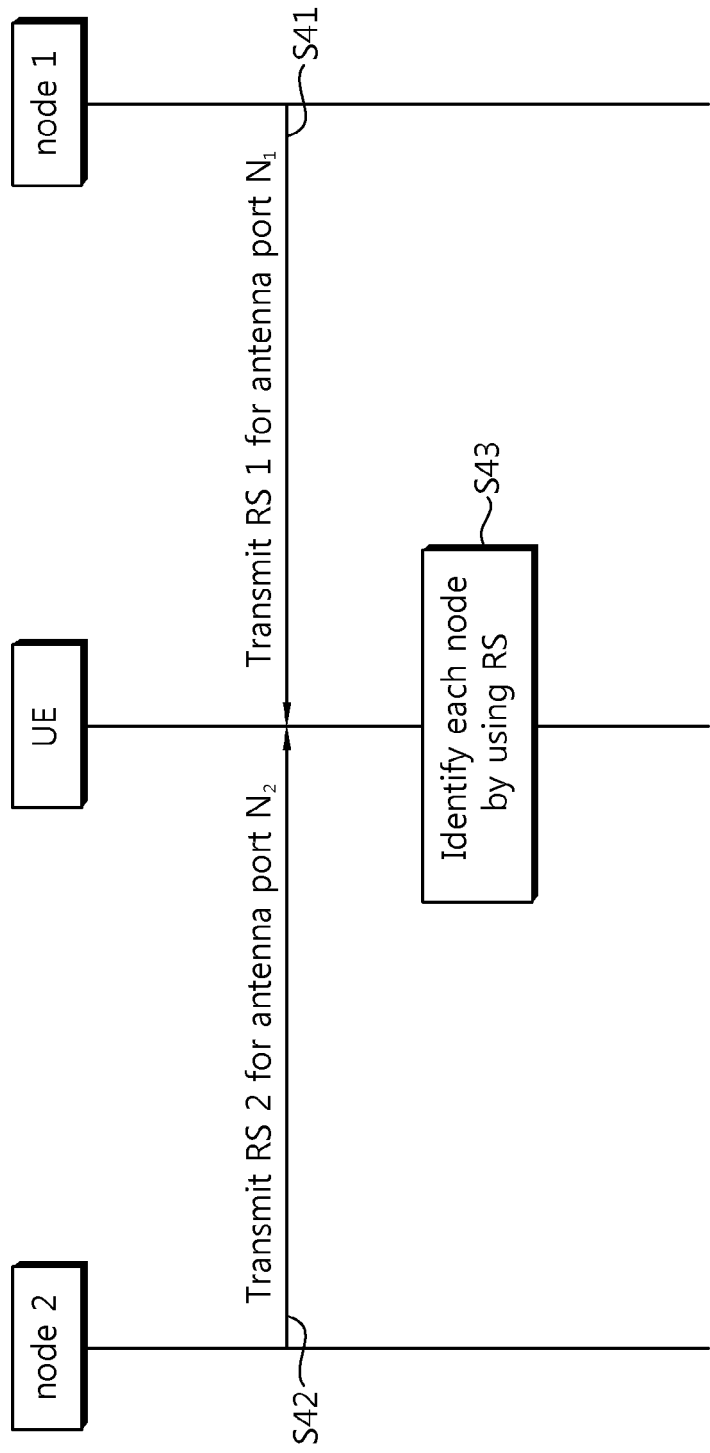
FIG. 13 shows a method of transmitting an RS by using an antenna port different for each node (i.e., Method 2).

FIG. 13 shows a method of transmitting an RS by using an antenna port different for each node (i.e., Method 2). In FIG. 13, a UE may be in a state where node information including antenna port information for each node is received from a BS.

Referring to FIG. 13, a node 1 transmits an RS 1 for an antenna port $N_1$ (step S41), and a node 2 transmits an RS 2 for an antenna port $N_2$ (step S42). The UE identifies each node by receiving the RS identified by the antenna port number (step S43). That is, the antenna port number plays a role of each node ID. In this case, the node ID of each node may be the same as a cell ID of the BS.

Alternatively, regarding an RS, a CSI-RS may be generated by using a cell ID (e.g., a cell ID 1 and a cell ID 2) having a value different from a cell ID (e.g., a cell ID 0 used in a BS) used for generation of a CRS which is a cell-common RS, and thereafter an RS pattern based on an antenna port of the CSI-RS generated by the cell ID 1 or the cell ID 2 may be transmitted as an RS of each node. In this case, the cell ID 1, the cell ID 2, and the antenna port number play a role of an ID of each node.

Each node can be identified according to a method in which a CSI-RS is generated by using a cell ID which is the same as a cell ID of a multi-node system and thereafter an RS pattern for a different antenna port is transmitted. Alternatively, each node can be identified according to a method in which a CSI-RS is generated by using a cell ID which is different from a cell ID of the multi-node system and thereafter an RS pattern for a different antenna port is transmitted according to each node.

The antenna port number included in node information may be directly used or may be used in a modified format. For example, the antenna port number at which the CSI-RS is used may be any one of {15, 16, ..., 22}. In this case, 5 bits are required to signal the antenna port number itself, which may cause waste of bits. When (antenna port number—15) is signaled by using the node information, the antenna port number can be expressed by the numbers 0 to 7, thereby decreasing the number of required bits to 3 bits.

When using Method 2 described above, a feedback mode for supporting a feedback of a CSI for each transmission antenna port can be specified. The feedback mode allows a UE to measure CSI values for respective antenna ports or an antenna port group and thereafter to feed back all or some of the measured CSI values to a BS. The antenna port group may be configured according to a predetermined rule or may be configured arbitrarily by the BS. For example, CSI-RS antenna port grouping information can be added to DL control information to report a scheme by which a US measures a CSI by grouping antenna ports (hereinafter, CSI-RS antenna ports) for transmitting a CSI-RS. Further, a CQI for a CSI-RS antenna port and/or a CSI-RS antenna port preferred by the UE and/or a PMI and/or CQI for a specific antenna port group designated by the BS can be added to feedback information. The DL control information may include physical layer control information (e.g., DCI in LTE) and UL control information (e.g., a radio resource control protocol in LTE).

Figure 14:
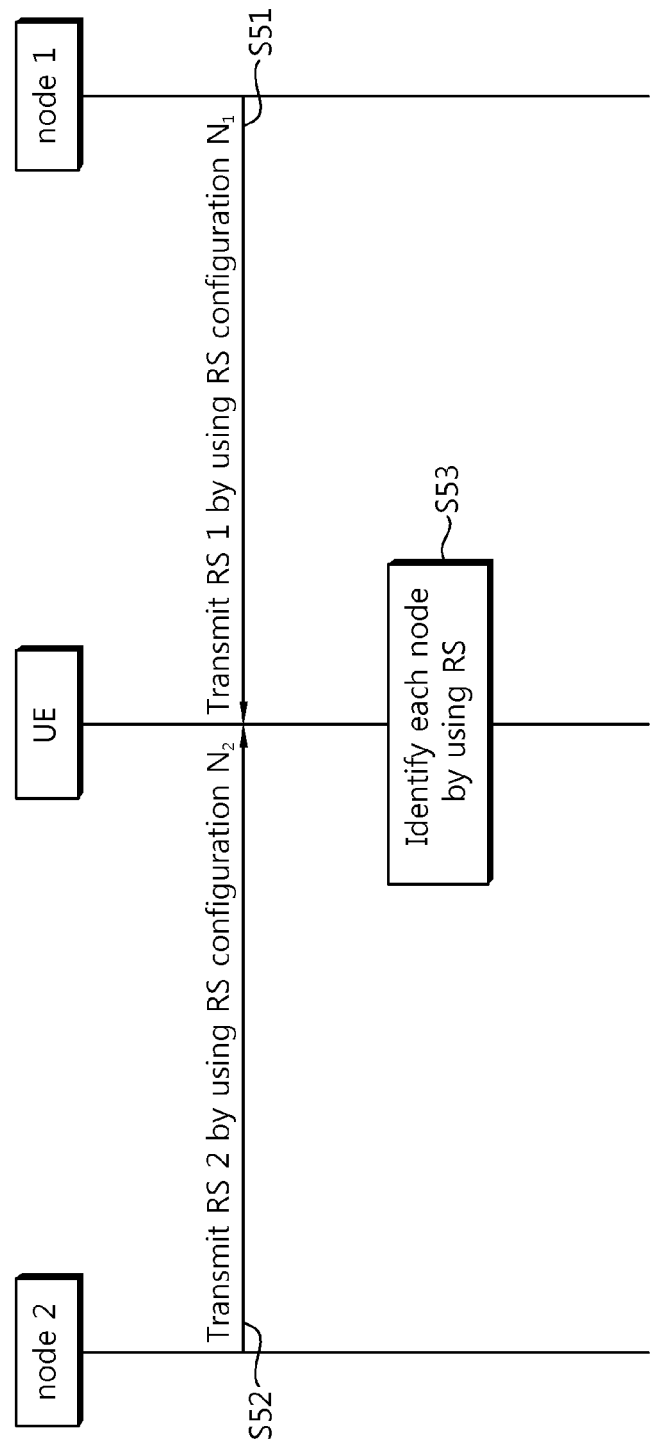
FIG. 14 shows a method of transmitting an RS having a different RS configuration for each node (i.e., Method 3).

FIG. 14 shows a method of transmitting an RS having a different RS configuration for each node (i.e., Method 3). In FIG. 14, a UE may be in a state where node information including RS configuration information for each node is received from a BS. Herein, the RS configuration information may include, for example, a CSI-RS configuration number described in Table 1 and Table 2 above and a CSI-RS subframe configuration number (i.e., CSI-RS subframeConfig) described in FIG. 3 above.

Referring to FIG. 14, each node uses the same cell ID and the same antenna port number, but transmits an RS by using a different RS configuration. That is, a node 1 transmits an RS 1 by using an RS configuration $N_1$ (step S51), and transmits an RS 2 by using an RS configuration $N_2$ (step S52).

For example, if the RS used in each node is the aforementioned CSI-RS, each node can transmit the RS by changing the CSI-RS configuration described in Table 1 and Table 2 above and the CSI-RS subframe configuration described in Table 3 above.

That is, in Method 3, the CSI-RS configuration number (Table 1 and Table 2) and the CSI-RS subframe configuration number (Table 3) play a role of an ID of each node. Therefore, when a UE feeds back a CSI for a plurality of nodes to a BS, a node ID capable of identifying each node can be used for the CSI-RS configuration number and/or the CSI-RS subframe configuration number. Alternatively, the node ID may consist of a function of the CSI-RS configuration number and/or the CSI-RS subframe configuration number. For example, the UE can feed back the CSI-RS configuration number of a preferred node to the BS as an ID of the preferred node. To implement Method 3, a plurality of CSI-RS configurations having non-zero transmission power can be defined.

A case of transmitting an RS having a different CSI-RS subframe configuration in each node is described. For example, when a node 1 transmits a CSI-RS by using a cell ID 0 and an antenna port number 15 in subframes {0, 10, 20, 30, ...}, a node 2 can transmit the CSI-RS by using the cell ID 0 and the antenna port number 15 in subframes {5, 15, 25, 35, ...}. In this case, the node 1 and the node 2 use different CSI-RS subframe configuration numbers $I_{CSI-RS}$. That is, referring to Table 3, $I_{CSI-RS}$ of the node 1 may be 5, and $I_{CSI-RS}$ of node 2 may be 10. For a legacy UE, that is, for a UE which operates based on the standard of up to LTE Rel-10, multiple subframe configurations can be defined for a CSI-RS having non-zero transmission power.

Figure 15:
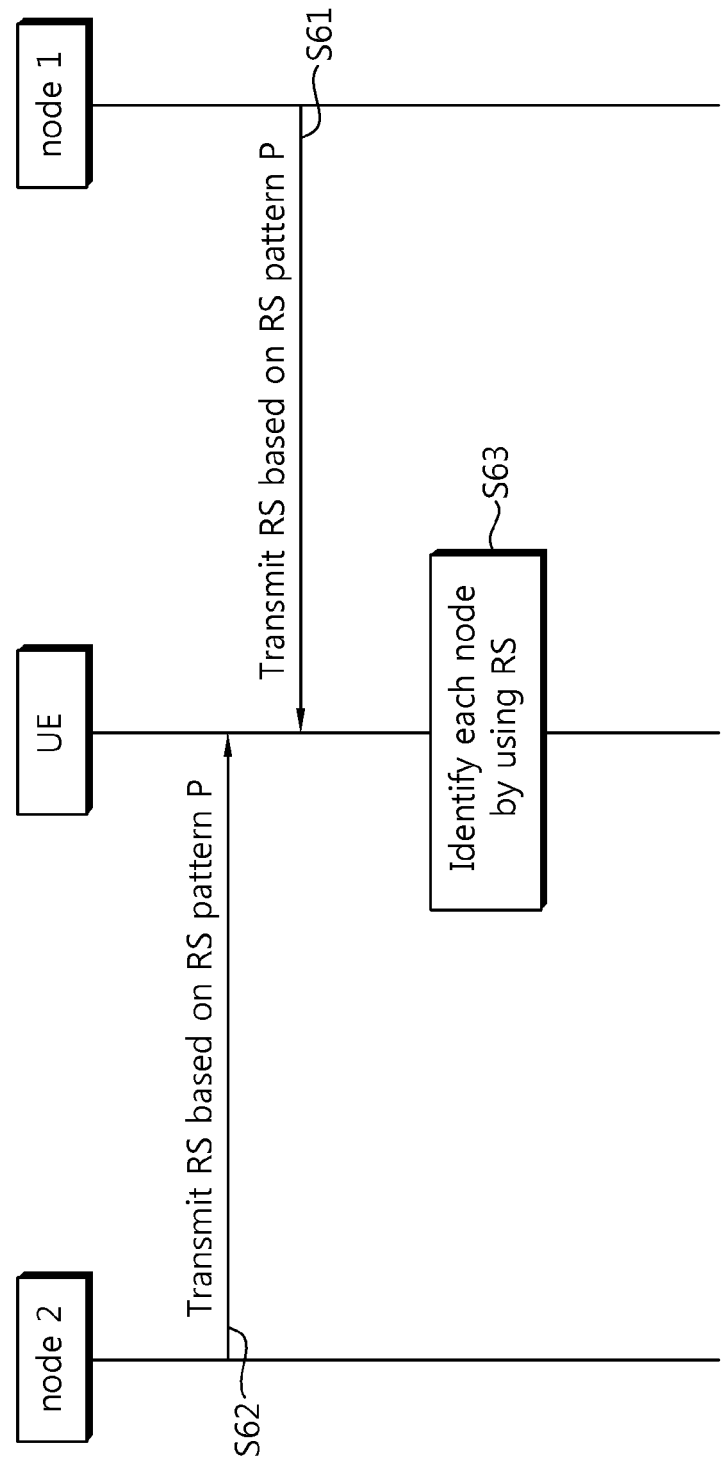
FIG. 15 shows a method of transmitting an RS corresponding to the same cell ID, the same antenna port, and the same RS configuration in a divisive manner from each node in a multi-node system (i.e., Method 4).

FIG. 15 shows a method of transmitting an RS corresponding to the same cell ID, the same antenna port, and the same RS configuration in a divisive manner from each node in a multi-node system (i.e., Method 4). In FIG. 15, a UE may be in a state where a sharing indicator (referred to as 'Flag_shared') for indicating whether a plurality of nodes share one RS pattern, sharing node information (referred to as 'N_shared_nodes') for reporting the number of nodes which share the same RS pattern, and an RS resource division index (referred to as 'ID_shared_node') for reporting a corresponding node when the plurality of nodes share one RS resource are received from a BS.

Referring to FIG. 15, each node uses pre-defined RS patterns in a divisive manner. In this method, each node is identified by transmitting an RS. That is, a node 1 transmits an RS based on an RS pattern P (step S61), and a node 2 also transmits an RS based on the RS pattern P (step S62). The RS pattern is a pattern defined according to a cell ID, an antenna port, and an RS configuration. That is, the node 1 and the node 2 transmit the same RS pattern in a time, frequency, or code divisive manner. In other words, a method of dividing an RS pattern includes a method of using the pattern by each node in a time domain (i.e., TDM), a method of transmitting the pattern alternately in a frequency domain (i.e., FDM), and a method of using the same RS pattern by applying a different orthogonal code (i.e., CDM). In this case, the TDM, the FDM, and the CDM can be used in a combined manner.

Now, an example of transmitting an RS from each node by dividing the RS according to TDM will be described.

For example, a node 1 and a node 2 can transmit a CSI-RS by using the same cell ID and the same antenna port respectively in subframes {0, 10, 20, 30, ...} and subframes {5, 15, 25, 35, ...}, and a BS can set a CSI-RS subframe configuration to $I_{CSI-RS}$=0 so as to have a period of 5 subframes. That is, the node 1 and the node 2 have the same CSI-RS configuration number and the same CSI-RS subframe configuration, and the BS can use an RS reference division index (i.e., 'ID_shared_node') of node information to report the number of nodes (i.e., the node 1 and the node 2) that share an RS pattern. In addition, information indicating whether each node shares an RS (i.e., 'Flag_shared'=yes) and information indicating the number of nodes ('N_shared_nodes'=2), i.e., indicating that two nodes share an RS pattern, are reported.

By using the node information, the UE can measure and feed back a CSI of the node 1 in subframes {0, 10, 20, 30, ... } and a CSI of the node 2 in subframes {5, 15, 25, 35, ... }. When the UE feeds back the CSI, an RS resource division index (i.e., 'ID_shared_node') can be added to preferred node information.

That is, in Method 4, the RS resource division index can play a role of an ID of each node.

The aforementioned four methods are not always used independently in the multi-node system. That is, some or all of the four methods can be used together. For example, some of a plurality of nodes coupled to one BS may transmit RSs corresponding to different cell IDs, and the remaining nodes may transmit RSs corresponding different antenna ports while having the same cell ID.

In addition, although a CSI-RS has been described above as an example of an RS in a multi-node system, the present invention is not limited thereto, and thus other RSs (e.g., positioning RS, CRS, etc.) can also be used. The present invention can also be utilized in another standard (i.e., IEEE 802.16x) other than LTE. In the present invention, a node may be any antenna group. For example, a BS consisting of a cross polarized antenna can be used by regarding the BS as a node consisting of a vertical polarized antenna and a node consisting of a horizontal polarized antenna.

Figure 16:
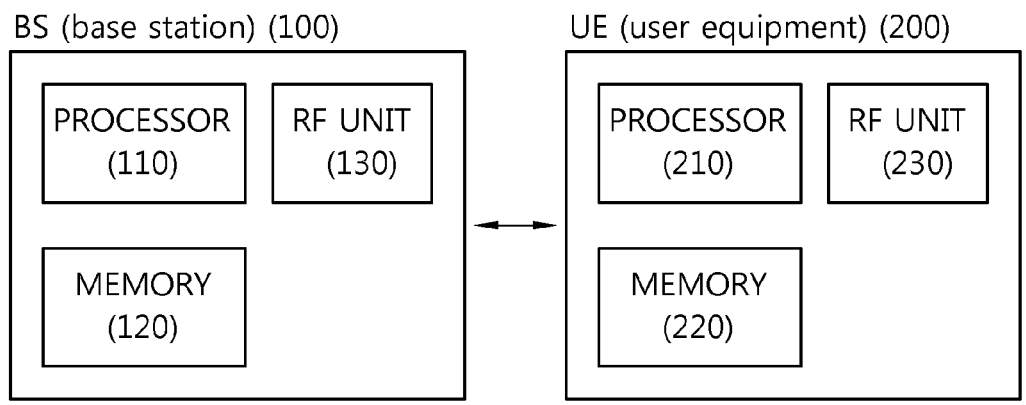
FIG. 16 is a block diagram showing a base station and a user equipment.

FIG. 16 is a block diagram showing a BS and a UE.

A BS 100 includes a processor 110, a memory 120, and a radio frequency (RF) unit 130. The processor 110 implements the proposed functions, processes, and/or methods. That is, the processor 110 can broadcast node information to the UE, and can perform scheduling on the basis of feedback information transmitted from the UE. The memory 120 is coupled to the processor 110, and stores a variety of information for driving the processor 110. The RF unit 130 is coupled to the processor 110, and transmits and/or receives a radio signal. The RF unit 130 can consist of a plurality of nodes coupled to the BS 100 in a wired fashion.

A UE 200 includes a processor 210, a memory 220, and an RF unit 230. The processor 210 receives node information from the BS, and receives an RS of each node. The processor 210 can use the node information and the RS to identify which node transmits a signal, and then can generate and transmit feedback information. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antenna ports for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

A method and apparatus for transmitting a reference signal capable of identifying each node in a multi-node system are provided. According to the present invention, each node can be identified by a user equipment by utilizing a cell identification (ID), an antenna port number, a reference signal configuration number, a reference signal division index, etc. Therefore, the user equipment can correctly report feedback information regarding each node in the multi-node system, and system performance can be increased by using the feedback information.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting a reference signal in a multi-node system including a plurality of nodes and a base station for controlling the plurality of nodes, the method comprising:
    transmitting node information to a user equipment;
    transmitting the reference signal to the user equipment from at least one node among the plurality of nodes on the basis of the node information,
    wherein the node information includes information capable of identifying the reference signal transmitted from the at least one node,
    wherein the node information includes antenna port information or reference signal configuration information used by each of the plurality of nodes,
    wherein each of the plurality of nodes transmits a different reference signal,
    wherein the node information is generated by using new seed number independently from a cell identification (ID) such that the node information and the cell ID are independently configured, and
    wherein a format of node information is different from a format of the cell ID; and
    receiving feedback information from the user equipment via at least one node among the plurality of nodes,
    wherein the feedback information includes the antenna port information or the reference signal configuration information.

2. The method of claim 1, wherein when the cell ID used by the base station consists of a cell ID group and an ID included in the cell ID group, a node ID of each of the plurality of nodes includes the same bit as the cell ID group.

3. The method of claim 1, wherein when the cell ID used by the base station consists of a cell ID group and an ID included in the cell ID group, a node ID of each of the plurality of nodes includes the same bit of the ID included in the cell ID group.

4. The method of claim 1, wherein each of the plurality of nodes transmits a reference signal corresponding to a different antenna port.

5. The method of claim 1, wherein each of the plurality of nodes transmits a reference signal corresponding to a different reference signal configuration number.

6. The method of claim 1, wherein each of the plurality of nodes transmits a reference signal corresponding to the same cell ID, the same antenna port, and the same reference signal configuration number, and the reference signal is transmitted by using a different time, frequency, or code.

7. The method of claim 1, wherein each of the plurality of nodes is an antenna or antenna group coupled to the base station in a wired fashion.

8. An apparatus for transmitting a reference signal, the apparatus comprising:
 a radio frequency (RF) unit for transmitting and receiving a radio signal;
 a processor coupled to the RF unit, wherein the RF unit includes a plurality of nodes,
 wherein the processor transmits information to a user equipment and transmits the reference signal to the user equipment from at least one node among the plurality of nodes on the basis of the node information, and
 wherein the node information includes information capable of identifying the reference signal transmitted from the at least one node,
 wherein the node information includes antenna port information or reference signal configuration information used by each of the plurality of nodes,
 wherein each of the plurality of nodes transmits a different reference signal,
 wherein the node information is generated by using new seed number independently from a cell identification (ID) such that the node information and the cell ID are independently configured,
 wherein a format of node information is different from a format of the cell ID,
 wherein the processor further receives feedback information from the user equipment via at least one node among the plurality of nodes, and
 wherein the feedback information includes the antenna port information or the reference signal configuration information.

* * * * *